Feb. 10, 1948. H. O. SCHJOLIN 2,435,930
ANGLE DRIVE MECHANISM COUPLING POWER PLANT AND VEHICLE AXLE
Filed Oct. 21, 1943 2 Sheets-Sheet 1
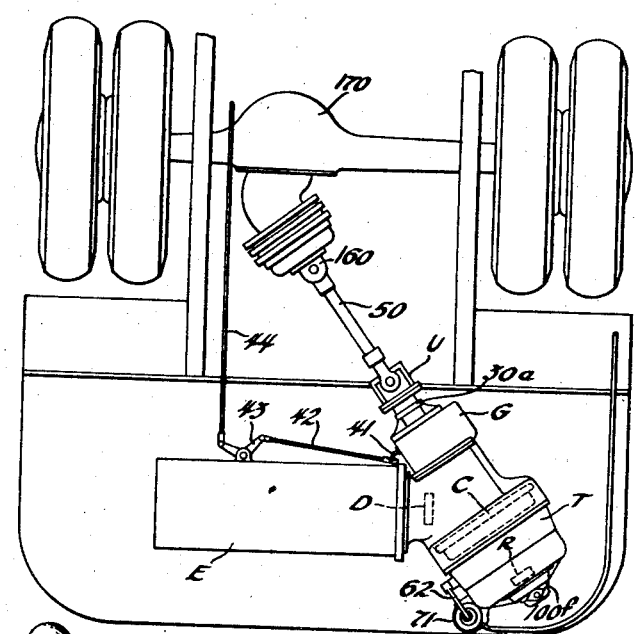
Fig. 1
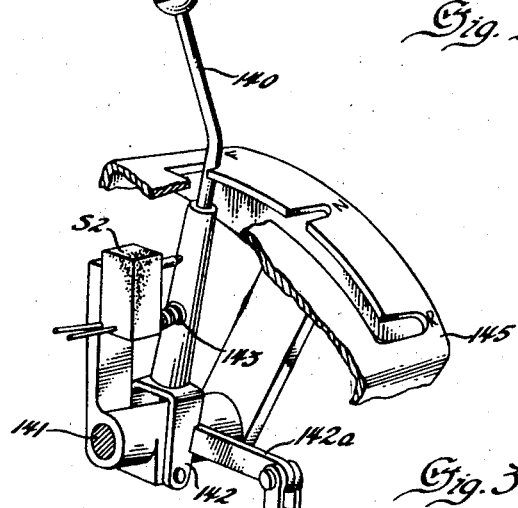
Fig. 3
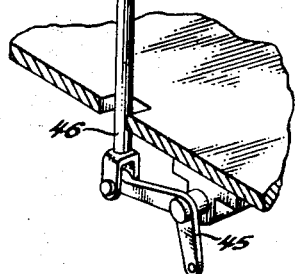
Inventor
Hans O. Schjolin
By Blackmor, Spencer & Flint
Attorneys

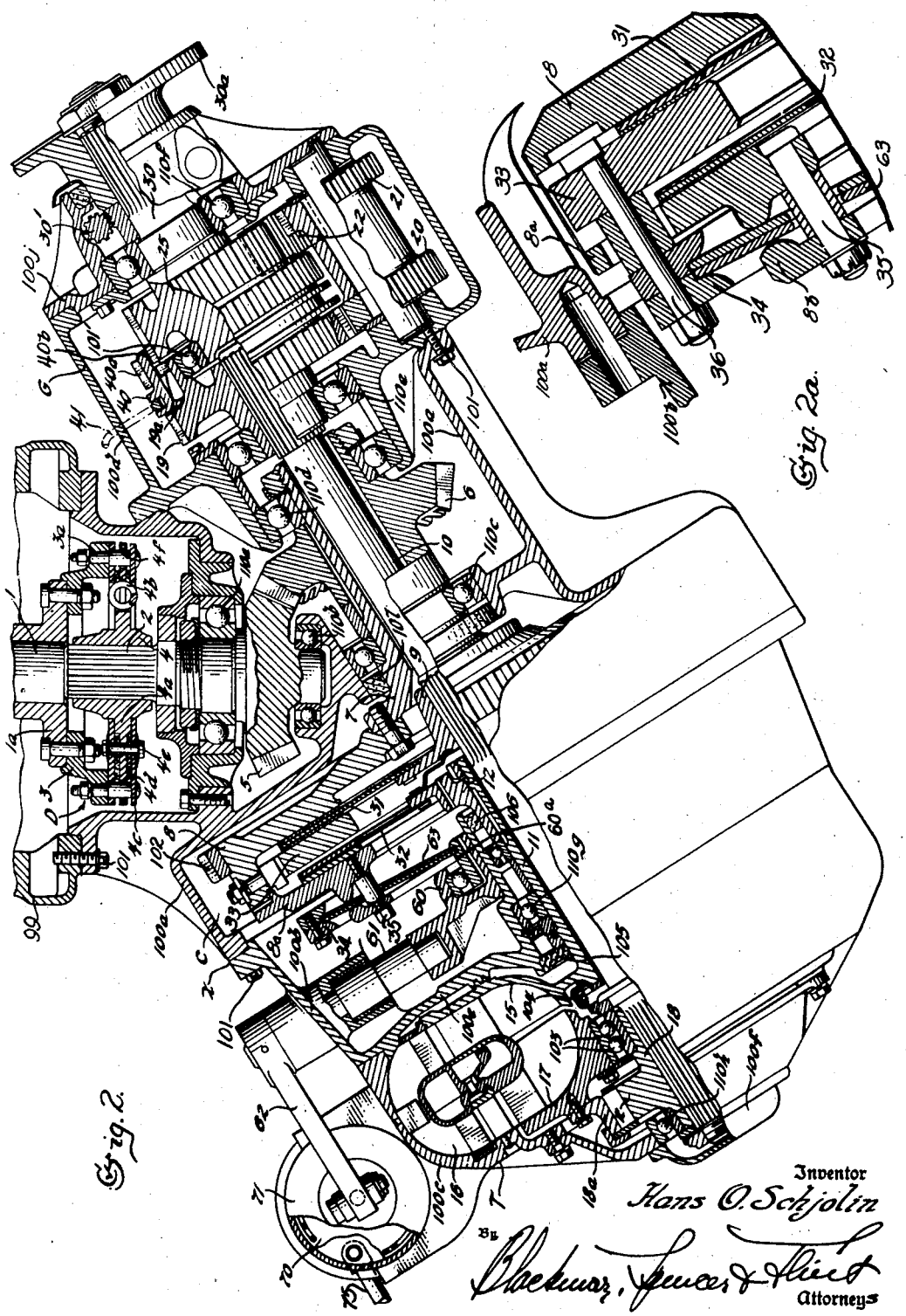

Patented Feb. 10, 1948

2,435,930

UNITED STATES PATENT OFFICE 2,435,930

ANGLE DRIVE MECHANISM COUPLING POWER PLANT AND VEHICLE AXLE

Hans O. Schjolin, Birmingham, Mich., assignor to General Motors Corporation, Detroit, Mich., a corporation of Delaware Application October 21, 1943, Serial No. 507,204

17 Claims. (Cl. 180—54)

The invention herein relates to motor vehicles, and especially to an improved compact grouping of driving mechanism for large heavy duty vehicles such as buses, trucks, and those of military nature In order to arrange the driving mechanism in a small space, for detracting least from the useful load space, the present invention therefore embodies a special drive arrangement for imparting the torque to the vehicle wheels with a minimum loss of power conversion, accomplished by mounting the entire torque multiplying mechanism at an angle to the engine shaft. By this arrangement, differing radically from others, the direct drive clutch shift and control elements are located separately, compartmented from, and at one side of the torque converter, accessible for repair and replacement. The net space saving achieved by the invention, in rear-engined vehicles is considerable.

A further advantage is an arrangement which lends itself to variations in form and size of torque converters to be used, and in the selection of different engines and input gear driving ratios to suit space and power requirements for given vehicles, so as to make it possible to utilize the same fundamental output gear and shafting combination with different drive units. By this means, if it be desired to use either a gasoline engine or a slower running Diesel having a different type of power curve, but with the same peak horse power, the same converter may be used without disturbing the remainder of the drive, while obtaining the best performance from the converter with either engine. It is also to be observed that with the present arrangement, the dimensions of the angle drive gears and bearings are much reduced as compared with earlier arrangments, since in the present invention the gears are only required to handle engine torque rather than load torque. A further advantage is derived from the fact that the center of gravity in the present drive unit is much closer to the engine, than in standarized installations, and that the net torque reaction to be taken is of low value as well as being exerted through a shorter lever arm, cutting down shock loads from propeller shaft thrust. The short overhang reduces impact loads on the drive mounting.

The accessibility of those portions of the drive requiring frequent attention is an outstanding part of the invention, namely: the torque converter unit, the overrunning clutch and the friction cluth assembly. This facilitates the speed at which a converter or clutch unit may be serviced in the garage or in the field so that the vehicle remains in operation over a longer period without service delay. The remainder of the drive for the most part becomes a permanent part of the vehicle. It is obvious that the reduction in size of the driving and drive-supporting parts because of the reduction of the loading effect, creates a considerable cost saving, and substantial saving of overall weight. The whole torque reaction is supported on the engine mounting, likewise an important feature.

By the arrangement described herein, the fluid torque converter drive only requires a minimum of readily changeable fluid seals, and as will be seen, the passage of fluid to and from the drive assembly is handled through simple openings, one in the rear bearing cap and the other through a casing hole at the periphery of the assembly. A further advantage appears in the fastening of the second stage converter guide vanes of the torque converter directly to the casing. An additional advantage lies in the inclusion of the clutch and converter cover portion of the casing with the front bearing of the transmission assembly, further facilitating disassembly and repair. The location of the clutching means in the angular shaft assembly is a distinguishing useful feature not believed shown in the prior art. The propeller shaft couples one end of the angular drive assembly to the axle differential without interfering with the spring action or mounting.

The present disclosure likewise provides simple and compact controls for the shifting of the double clutch drive-ratio changing elements, with positive remote station operation by the driver.

Figure 1 is a partial view of the rear drive plan of the invention for a motor bus. In this figure, the engine E driving through a vibration dampener D, delivers its torque to the output shaft flange 30ª through one of the clutches of the double clutch assembly C; or through the other of said clutches coupled to a turbine torque converter and through a roller clutch R, located at a point convenient for inspection and replacement. A gearbox G provides the means for selecting forward and reverse drive, or neutral. In Figure 1 is shown a universal joint U connected to output driving flange 30ª, and driving a diagonal jack shaft or propeller shaft 50, universal joint 160 and differential gear 170 which in turn transmits the drive to the vehicle wheels. It will be noted that the only angular conversion of power between the engine and the parallel rear axle, other than by the differential gear of the axle, is by the power shaft input gearing adjacent the vibration dampener D. It is not deemed necessary to show the customary engine mounts of E on the vehicle frame, since these are merely made sufficiently strong to support the added load of the variable speed drive assembly, as stated at the end of the third paragraph above.

Figure 2 shows in plan detail the structural arrangement of the supporting and driving parts. It should be observed that the engine casing, clutch and converter housings and gear casing are integrally supported against torque reaction.

In Fig. 2a, the clutch parts are enlarged from their appearance in Fig. 2 to show the action of fitting 34 bolted to member 8, to restrain the outer edge of the compound disc spring 63, which latter is moved at its inner radial portion by sleeve 60, as described further in detail following.

The casing at the left of the figure has flanged plate 100$^f$ removable for service or replacement of roller clutch R without disturbing the other drive elements, and the external member of the unit R is removable by releasing bolts (not numbered). The turbine casing 100$^c$ is joined to the clutch casing 100$^a$ at X by stud bolts 101 or equivalent fastenings, so that the turbine device and its clutches are readily serviced or replaced without affecting the other more permanent units of the drive mechanism.

Figure 3 is a perspective view in part section of the gear lever interlock control shown in Figure 4.

The engine shaft 1 in Figure 2 terminates in flange 1$^a$ which is bolted to the driver ring 3 of the friction vibration dampener assembly D, the driven hub 4 of which is splined to the transmission input shaft 2, the latter being formed integral with bevel gear 5 meshing with bevel gear 6 of the transmission input sleeve 7.

The input driving drum 8 is bolted to sleeve 7 and is a part of the double clutch assembly C which connects the drive of the engine with either of the driven clutch plates 31 or 32.

The transmission main shaft 10 serves as an intermediate shaft between the two ends of the assembly and is splined to accommodate the hub 9 of clutch driven plate 31; it extends through the transmission to the left where it is splined to the inner member 18 of the roller clutch assembly R, and extends to the right where it is splined to drive the combination gear and jaw clutch 19 of the reversing gear unit G.

The clutch plate 32 is riveted to hub 12 rotating with sleeve 11 integral with the impeller 15 of the torque converter unit T. A torque converter unit T shown in section in the present example of Figure 2, is similar to that of my U. S. Letters Patent 2,308,113, filed October 4, 1940, and issued January 12, 1943. The unit consists of three fundamental elements; an impeller 15, a fixed reaction assembly 16, and a driven member 17, the latter being bolted to the external member 18$^a$ of the roller clutch assembly R. Collar 60 slides axially to shift the inner radial fingers of clutch plate loading spring.

At the right of Figure 2 is shown the reverse gear unit consisting of a gear train having input member 19, and output gear 25 integral with shaft 30, splined to the output driving flange 30$^a$. Shaft 30 is the output shaft of the assembly and drives the propeller shaft 50 of Fig. 1 thru universal joint U. The gear 19 meshes with input counter gear 20 which is rotatable with the counter shaft section, to which the second counter shaft gear 21 is attached or is integral. A splined collar 40 toothed externally at 40$^a$ for meshing with reverse idler gear 22, is carried on a forward extension of the teeth of gear 25 with which its internal teeth 40$^b$ mesh. The gear 19 has external teeth 19$^a$ which are engaged with the teeth 40$^b$ of the slider 40, when the latter is moved into forward position. The train of the gear unit consists of input gear 19 splined on shaft 10 and constantly meshed with the countershaft group 20, 21 which spins idler 22. The slider 40 carries internal teeth 40$^b$ which may be driven by teeth 19$^a$ of gear 19 when the slider is advanced to the left as shown in Fig. 2. For reverse shift, the slider is moved to the right, disengaging teeth 19$^a$ and meshing teeth 40$^a$ with the teeth of idler 22. Since the torque converter delivers no drive torque at idle throttle when this shift is made, the shift proceeds without a need for a neutral dwell so that internal teeth 40$^b$ of slider 40 may shift directly from mesh with 19$^a$ while teeth 40$^a$ mesh with idler 22.

When the slider is moved toward the rear of the gearbox it establishes the drive through the reverse train 19, 20, 21, 22, and 25.

In the arrangement and demonstration of the drive noted above, the bevel gears 5 and 6 are related to each other in the ratio of 4 to 5 respectively, so that the sleeve 7 and driving drum 8 may rotate at a somewhat slower speed than that of the engine.

The vibration dampener unit D is arranged to permit limited differential movement between the flange 3 and the hub 4 by virtue of radial slots for the bolts 3$^a$, cut in the plate 4$^a$ of the hub 4. The slots are of wider dimension than the diameter of the bolts and the latter are centered through the action of compressed springs 4$^b$ held in apertures in the retaining plates 4$^c$. the bolts 3$^a$ have adjusting nuts which exert a given tension for establishing friction drag between the retaining plates 4$^c$ and the central flange 4$^a$ of the hub 4. Additional friction is obtained by the inclusion of friction washers 4$^d$ placed between the external plates and the central flange and providing a friction force augmented by the tightening of bolts 4$^e$ which pass through the assembly at a shorter radial distance than bolts 3$^a$. The permitted clearance for the movement of the bolts 4$^e$ with respect to the central flanges 4$^a$ is obtained by the use of a circumferential slot 4$^f$ in flange 4$^a$. Belleville washer springs are included in the assembly of bolts 4$^e$ so that a considerable friction preload adjustment can be set up by the operator, an expedient useful, in order to have the apparatus successfully absorb the torque vibrations of large heavy engines. It will be observed that this device can be tuned over a limited range of vibration frequencies by changing of the initial tension provided by bolts 3$^a$ and 4$^e$.

The unusual arrangement of the foregoing-described drive has a number of advantages discussed elsewhere in this specification. It will be noted that the diagonal casing 100$^a$ can be completely detached for unit replacement. It is useful that the casing portion 100$^c$ may be detachable from 100$^b$ for service to turbine parts, and also that 100$^b$ be detachable from 100$^a$ so that different designs or forms of torque converters and clutches can be installed. It is of primary importance that the casing portion 100$^f$ at the leftward end may be readily detached without disturbing the remainder of the driving mechanism for the purpose of replacing or adjusting freewheel clutch R. It is further important that the joint at X between casing sections 100ª and 100ᵇ be provided. It will also be noted that the reversing gear unit G can be separated by ready removal of the casing portion 100ᵈ, so that whatever infrequent adjustments or replacements are required in this unit can be readily made, quickly and simply.

These compartment sections are detachable as shown in Fig. 2, by removal of the bolts 101, for each parting plane fit. The engine casing 99 is separated from housing 100ª by similar removal.

In order to accomplish the above successfully, it is essential that the arrangement and gearings to support the shaft and driving parts correspond with the major axes of drive. To this end bearing 110ª and bearing 110ᵇ support the transmission input shaft 2 firmly in the casing section 100ª. The diagonal main shaft 10 is supported in bearings 110ᶜ and 110ʰ in the casing sections 100ᶜ and 100ᵈ, while the input driving shaft sleeve 7 is mounted in casing 100ª and 100ᵈ in bearings 110ᶜ and 110ᵈ. The rear shaft 30 is piloted by bearing 101' in the inner pocket of gear 19 of shaft 10, and for support in the casing 100ᵈ and the flange plate 100ʲ by bearing 110ᶠ. The torque converter sleeve 11 is supported in web 100ᵉ of the casing section 100ᵇ by bearing 110ᵍ, and the circumferential guide rings for the impeller 15 such as shown in Figure 2 may provide support in web 100ᵉ. The sleeve 60 of the clutch operating mechanism is mounted to slide on an extension of the web 100ᵉ, for supporting the leftward portion of hub 12 and the sleeve 11, and the double-row bearing 103 of Figure 2 may align the turbine rotor 17 with respect to the shaft 10 and the roller clutch inner input 18.

The arrangement of the present demonstration includes the seal 104 between the turbine and the hub impeller 15 and the flange of 10; the seal 105 located between the hub of impeller 15 and the web 100ᵉ of the casing; and the seal 106 prevents leakage of grease through the shafting and the extension of web 100ᵉ into the compartments formed by casing for the clutch assembly C. The seal 107 is located externally with respect to sleeve 7 and prevents flow of lubricating oil from the gear spaces of casing section 100ª into the compartment housing the clutches 31 and 32.

The clutch collar 60 of Figure 2 may be controlled for its transfer of drive between the clutch plates 31 or 32 by cam member 61 mounted to rotate in the sidewall of the casing 100ᵇ as shown in Figure 2. The cam is rotated by arm 62 reciprocated by the piston 70 shown in section in Figure 4. A method of operation of this double clutch control apparatus is described in my U. S. Letters Patent No. 2,308,113, filed October 4, 1940, and issued January 12, 1943, and shown in Figure 6 of that patent.

Fig. 2a shows in detail the relationship of the parts operated by the clutch actuator mechanism to provide alternate drive by the clutch drum 8 of the clutch discs 31 and 32.

Engine-connected gear 6 and sleeve 7 support and drive the presser plate 33 in its gripping of disc 31 or disc 32. Shaft 10 carries splined hub 9 and disc 31 equipped with proper facings. Rotating on shaft 10 is hollow shaft 11 attached to splined clutch hub 12 of disc 32 which also has proper friction facings.

Shaft 7 may drive shaft 10 directly thru clutch disc 31 or indirectly thru the torque converter unit shown at the left of Fig. 2, by clutch disc 32.

The clutch control and actuator mechanism consists of fittings 34 bolted to member 8, arranged to restrain the external edges of compound disc spring 63, the inner edges of which may be shifted to the right or to the left by movement of bearing sleeve 60ª and sleeve 60 longitudinally through eccentric 61 moved from outside the gear casing by lever 62.

The fulcrum action is provided by studs 35 and members 8ª, 8ᵇ. Presser plate 8ª carries studs 35 passing thru apertures in disc spring 63, the studs support ring 8ᵇ, while the outward facing portions of 8ª and 8ᵇ are shaped to bear against the faces of spring 63 located between them.

The fittings 34 are attached to bolt 36 headed in the outer portion of presser plate 33, and a spacer collar provides proper longitudinal positioning between the fittings 34 and the plate 33 so that upon axial movement of member 60 the disc spring 63 is flexed about the fulcrum afforded by members 8ª—8ᵇ, and a parallel motion of fittings 34, bolt and plate 33 in the same direction of motion of member 60 results, the plate 33 gripping the plates 31 or 32 against 8 or 8ª at the end of the movement.

This construction is shown in my United States Letters Patent aforesaid, and described therein on page 4, beginning at line 10.

The admission and control of air pressure to the lower face of piston 70 is obtained by the control arrangement of the controls described in the applicant's United States Letters Patent No. 2,380,677, issued July 31, 1945, for improvements in "Turbo drive controls," and particularly the arrangement described in said patent in connection with Figures 16 and 17 thereof.

The clutch shifting piston 103 of Fig. 17 of the said patent is shown in cylinder 105, ready for rocking the clutch operating lever 81 corresponding to lever 62 of Fig. 2 herein toward the "up" position, in which the collar 60 of Figure 2 shifts the spring 63 to load clutch plates 31.

The magnet valve V of the said patent Fig. 17, such as is shown in my U. S. Letters Patent No. 2,322,479, in Figure 2 hereof, delivers reservoir air pressure to the cylinder 71 for raising the piston 70 against spring 72, or shuts off the reservoir pressure and releases pressure from cylinder 71, to permit spring 72 to lower the piston 70.

The current supply to the magnet valve V of the said patent Fig. 17 passes through switch S¹, and gear lever switch S⁴ from the battery; and also passes through solenoid 160 and governor switch (not numbered); in parallel paths.

The piston rod 100 has a latch relationship with the lock pin 162 when air pressure moves the piston 103 toward direct drive position.

With the vehicle at rest, engine running, the operator moves the gear lever 140 of Figure 3 to forward drive position, to engage the slider 40 of Figure 2 with the teeth 19ª of member 19.

Advancing the engine throttle causes the torque converter to deliver torque to shaft 10, since clutch plate 32 is normally engaged.

Referring back to Figure 1, rod 44 is connected to bellcrank lever 45 of Figure 3 pivoted to rod 46 extending through the floorboards and pivoted to arm 142ª of part 142 of Figure 3; and rocks bellcrank 43 pivoted to rod 42 having swivel connection with the arm of shifter fork 41.

The gear lever 140 of Figure 3 is fastened to shaft 141 rocking with mounting 142 located forward in Figure 1, at the operator's station. The lever 140 and mount 142 rock fore and aft, the mounting 142 of the lever 140 permitting a small lateral motion of the mount 142. The lever 140 is guided in the E-slot of the upper portion of the casing 145 for reciprocation, and for lateral motion into the slot passages "F," "N" and "R" for forward, neutral and reverse shift operation.

The lever mechanically operates slider 40 of Figure 2 by appropriate linkages, and its action constitutes an improvement over the arrangement of Figure 9 of my Letters Patent U. S. 2,322,479.

A fluid torque converter of the type shown in the present demonstration does not have adjustable mechanical members for varying its drive characteristics, which latter are therefore fixed and determined by its fluid capacity, and by the number, spacing and shaping of its blades. In applying a unit of this character to a specific vehicle load and speed problem, the working out of the factors for best efficiency of the torque converter establishes a narrow range of converter speeds, torque capacity and given speed ratio range, which in turn fix the speed and torque range of the engine used to drive the vehicle through the converter.

The work of keeping large heavy-duty vehicles in operation during an engine shortage, or in operation in the field of war where engine replacement is a major problem calls for ingenuity in adapting engines of differing speed and torque ranges to the drives of one specific type of vehicle, especially when the power transmission of the vehicle has speed and torque response characteristics which are so narrowly limited by the weight, and load range and allowed speed of the vehicle. Experience has shown that with a vehicle drive assembly of the above noted arrangements with a gasoline-fueled engine, it cannot be directly replaced by a slower speed Diesel engine of the same horsepower rating, without a loss in both economy and performance. The problem cannot be solved by changing the rear axle ratio since this will destroy the close harmony of the fluid torque converter characteristics with those of the vehicle drive. The invention herewith provides for ready removal and replacement of the engine, and the equally ready change of drive gears between the engine and the power transmission assembly, which permits the fluid torque converter and the clutch parts to be readily replaced while drive mechanism between it and the vehicle wheels remains undisturbed, as a fixed part of the drive, although the input power means is changed.

For maintaining full schedule field operations, the invention herein enables the heavy-duty vehicle to continue in indefinite, long service supported only by replacement engines, converters and gear pairs corresponding; eliminating further need for field supply or warehousing of various sizes of torque converters and axle gears.

In such field operations where it may be necessary to retain the torque converter in the vehicle and use another engine of a different power characteristic, the gear pair 5, 6 may be replaced by a gear pair of differing ratio to match the new engine to the torque converter, in the following manner: the housing 100ᵃ is detached from the engine casing across the joint shown, and this permits the withdrawal of the drive assembly with the casing 100ᵃ, since the jackshaft 2 may slide free of collar 4ᵃ on splines 4. The retainer bolts for bearing 110ᵃ are removed, permitting removal of gear 5 and shaft 2.

The casings 100ᵃ and 100ᵇ are separated at X and the whole assembly to the left, may be slidden free, since shaft 10 is only splined to clutch gear 19, and shaft 7 with gear 6 is released from bearing 110ᵈ by release of the nut and screw fitting shown. The bolts holding drum 8 to shaft 7 are removed and the new shaft with gear, replacing 6, 7 installed. The reverse of this sequence is followed with the new gear pair in place, a separate unit assembly of jackshaft 2 and gear 5 being required. The convenience of being able to detach whole units of this otherwise complex assembly for such replacement operations is believed amply demonstrated herein.

It is obvious that with the facilities provided by the invention, the vehicle so equipped, regardless of engine failure or of shop time needed for engine repair or adjustment, can continue in effective operation for longer periods "a-wheel," and thus have its useful load-carrying life considerably extended, on a "service-per-time" basis. This quality is not only important during peace when operating cost-time factors regulate profits, but also during war when meager and scattered field service facilities are overloaded by the requirement for mobility, and by the frequent losses of remount stations.

Another important phase of the invention is that of the space saving afforded by the angle drive grouping which places the entire power transmission and torque conversion mechanism on the angle drive centerline. With rear-engined power plants, there is a constant problem of finding space for cooling apparatus, accessory mechanism such as starters, compressor systems, air conditioning machinery, special electrical generator equipment and the like. The present invention relieves the transverse power plant compartment space at the driving side of the engine, so that the necessary width of the vehicle can be less, or the saved space can be used for accessory devices which otherwise use up "payload" space elsewhere in the vehicle.

The normal power plant which includes the transmission in line with the engine has become a mass and volumetric problem with the utilization of flexible mountings to assist in absorption of torque vibrations, because of the great linear extension of the masses involved in the torque-supporting systems.

While the casual observer is not aware of the importance of saving a few pounds of weight of driving parts nor that such savings are reflected in savings in bearing and casing weights, it is understood by those skilled in the art who will appreciate the teaching of the present invention which provides improvement in economy, performance and extension of useful life of motor vehicle drives.

The arrangement herein of composite casing compartmenting for quick removal of unit sections of gearing, clutches, converter, and shafting without disturbing other members of the drive assembly is believed unique. It will be noted that the converter output roller clutch R is readily exposed for inspection and servicing without requiring the other units to be disassembled; the converter unit T is also removable with the unit R; the compartment for the clutches C may be opened also with the detachment of units R and T; and the assembly G at the opposite end of the power transmission is likewise as readily serviced. The assembly may also be detached bodily from attachment to the engine casing for changing the whole assembly unit. The arrangement of bearings which provides full support for the driving parts is coordinated with the division of the subcompartments, greatly facilitating removal, inspection and replacement, without disassembly of other units not of immediate concern.

The control mechanism shown in Figure 3 is small, neat and compact. It has not been deemed necessary to duplicate herein the detailed construction of the magnet valve, solenoid neutral stop, governor and switches, since these are shown in my Letters Patents and applications mentioned herein and in the divisional application hereto, namely U. S. Serial Number 611,789, filed August 21, 1945.

The arrangement herein of the mechanical and servo-operated controls is so organized that the portions of the assembly requiring most frequent attention are exposed at the rear of the vehicle for convenient inspection, adjustment and repair, whereas the portions requiring least attention are located on the bulkhead side of the engine compartment.

The starter gear 102 of flywheel 8 permits starting of the engine thru the elastic yielding of the dampener device.

These and other advantages noted elsewhere in this specification are provided in the novel assembly described herein in demonstrating the invention. The appended claims are drawn to cover all proper modifications and adaptations and it is not my intention to limit the scope of the invention to the particular embodiments shown herewith, since one skilled in the art and made acquainted with the teachings set forth in the present specification would know how to utilize these teachings while departing from the exact details of construction shown and described.

I claim:

1. In power transmission mechanism, an engine, an engine shaft, a diagonally arranged driving mechanism including a power input sleeve, releasable clutches adapted to be coupled to said sleeve, a torque converter adapted to be coupled to said sleeve by one of said clutches, a main shaft intersecting the centerline of said engine shaft and adapted to be coupled to said sleeve by another of said clutches; input bevel gearing connecting said engine shaft and said sleeve, a freewheel clutch in the line of output drive of said torque converter to said main shaft operative when the torque converter is transmitting power; a centrally located compartment secured to the said engine and housing said bevel gearing, said sleeve and said clutches, a second compartment forming a portion of said torque converter adjacent the first-named compartment, a third compartment including elements of said torque converter, said last two compartments being detachable, and a cover plate removable from said third compartment affording access to the said freewheel clutch.

2. In a power transmission assembly for vehicles, a driving mechanism embodying in concentric sequence a fluid torque converter and a main shaft, a pair of alternately operable friction clutches one of which couples to the input of said converter and the other of which couples to said main shaft, a forward and reverse gear unit adapted to couple to said main shaft and connected to a load shaft; control means for said clutches and said unit, an engine, an engine shaft, and a power input driving arrangement consisting of input gearing and a hollow shaft driving a drum adapted to transmit the power of said engine shaft thru said input gearing to said clutches, said arrangement being located between the said clutches and the said forward and reverse gear unit.

3. In power transmissions having an engine casing and having an engine and drive transmitting means therefor supported by said casing, comprising bevel gearing adjacent a driving mechanism with its centerline arranged diagonally to the axis of said engine and intersecting same, an arrangement thereof in which said mechanism is located at one side of said intersection and includes a manually shiftable gearing unit, a power transmitting shaft connected to a driving element of said unit, a power input sleeve surrounding a portion of said shaft and extending to the other side of said intersection, a variable speed transmission located likewise at the other side of said intersection, releasable clutches concentric with said sleeve and said power transmitting shaft and selectively operable for providing drive through said transmission or directly thru the last named shaft, and housing means for said drive transmitting means supporting same by attachment to said casing and compartmenting dividing said housing means into groups adapted for removal of said transmission and said clutches without changing the drive relationships of said driving mechanism.

4. In vehicle drive devices which include an engine casing an engine shaft, a final drive differential axle parallel to said shaft, transmission housing means supported on said casing, a driving mechanism supported by said means and having a centerline oblique to the axis of said engine shaft and coupled thereto by bevel gearing, an arrangement thereof in which said mechanism has an output shaft having its power delivery end extending away from and to one side of the intersection of said axis and centerline toward said axle, compartmenting in said housing means for clutches and for torque conversion means located coaxially with said mechanism and on the other side of said intersection, away from the said power delivery and extension of said output shaft, with releasable clutch means and torque conversion means included in said mechanism and mounted in said compartmenting, said clutch means being controllable by an operator, controls for said clutch means, and a gear unit located adjacent the said power delivery end of said output shaft and coupled obliquely to said axle and equipped with a control device effective for establishing forward or reverse drive, or neutral by said mechanism.

5. In the combination set forth in claim 4, the subcombination of a freewheel clutch included in the output drive assembly of said torque conversion means, and of compartmenting consisting of a removable cover at one end of said housing arranged for removal and replacement of said freewheel clutch without changing the drive relationships of the other drive-transmitting units or elements of the said mechanism consisting of said torque conversion means, said clutches, said bevel gearing, said gear unit and said output shaft.

6. In power transmission devices supported by a vehicle framing, and having an engine placed transversely at the rear thereof with a casing for said engine supported on said framing, said engine having a transverse shaft centerline at the rear of said framing, and with a differential axle located forward of said engine with the centerline of said axle parallel to the shaft of said engine, the combination of a transmission drive housing angularly located with respect to said engine shaft and supported by said casing, selective variable speed ratio drive mechanism with drive-transmitting elements supported within said housing and having bevel gear coupling with one end of said engine shaft and with the central differential unit of said axle on a centerline oblique to the parallel centerlines of said axle and said engine, and removable compartmenting projecting toward the rear of said frame and included in said housing for supporting a pre-determined group of the drive transmitting elements of said mechanism thereby providing facility for the removal or replacement of said group without changing the drive relationship of said bevel gear coupling.

7. In the construction described in claim 6, the subcombination of a drive-transmitting free-wheel clutch included in said mechanism and of an arrangement of said compartmenting permitting removal or replacement of said clutch without changing the drive relationships of any other drive-transmitting elements of said mechanism.

8. In vehicles having power plants and driving mechanisms remote from driver control stations, having a power plant arranged transverse to the main axis of a vehicle, with a final drive axle arranged transverse to said axis, the combination of a diagonal drive mechanism connecting said power plant and said axle comprising input gearing located between said power plant and said mechanism, and said mechanism and power plant having common torque reaction support, shiftable ratio changing transmission clutches included in said mechanism coaxial with the diagonal axis thereof and located at the farther end of said mechanism from the connection with said axle, shiftable gear means thereof located adjacent said connection, and a shiftable control means for said mechanism for establishing forward neutral or reverse drive through the driving members of said mechanism, consisting of a shifter member for said clutches and of a slider member for said gear means.

9. In power transmitting devices for drives having a vehicle driving axle including a differential gear, a power plant arranged parallel to said axle, and with a drive mechanism coupling said axle and power plant and having common torque reaction support with said power plant, said drive mechanism being placed with its axis diagonally disposed relative to said parallel arrangement of said power plant and said axle and located at one side of the vehicle, an arrangement thereof in which said mechanism is coupled to said power plant by replaceable gear pairs and including selective ratio driving clutches concentric with the diagonal axis of said mechanism, and said clutches being coupled directly to the output element of said replaceable gear pairs.

10. In motor vehicle driving mechanism for a vehicle having its engine located transversely at the rear, with a wheel driving axle assembly located forward and below said engine with its centerline parallel to that of the engine, the combination of a power transmission assembly adjacent the output coupling end of said engine and having common torque reaction support with said engine, the said assembly being arranged at an angle to the centerline of said engine and said axle assembly for coupling same to effect variable speed drive of said vehicle, a bevel gear unit coupling said assembly to said engine, an arrangement of the said power transmission assembly including a fluid turbine torque converter adjacent one end thereof, an input shaft, an intermediate shaft, a one-way clutch at the converter end of said assembly and connecting the output of said converter to said intermediate shaft, a clutch device located between said converter and said bevel gear unit and adapted to connect said shafts or to connect said input shaft with the input of said torque converter, a forward-and-reverse gear unit coupling said intermediate shaft with said axle assembly, and a pair of meshing bevel gears included in said bevel gear unit the input gear of which is driven by said engine and the output gear of which is fastened to said power transmission input shaft for transmitting the engine power to the said power transmission assembly.

11. In power transmission assemblies for motor vehicles arranged to provide uninterrupted driving torque between an engine and a load shaft, an organization of drive transmitting elements consisting of an input hollow shaft extending across the centerline of said engine and having an input power transmitting drum at one end thereof, a concentric fluid torque converter adjacent said drum and having its input element clutchable to said drum, a concentric solid shaft likewise extending across said centerline and clutchable to said drum and having a one-way clutch connection with the output element of said converter, clutching mechanism operable to connect said drum alternately with the input element of said converter or with said solid shaft, a forward-and-reverse gear unit driving said load shaft and driven by said solid shaft, and a pair of input bevel gears transmitting the power of the engine to said hollow shaft at a reduced speed ratio, said bevel gears being detachable and replaceable by similar pairs of different speed ratios for the purpose of adapting engines having different performance characteristics to the fixed characteristics of said converter.

12. In power drive arrangements for a motor vehicle having a driving axle located transversely of the vehicle with an engine located adjacent said axle and with its centerline parallel thereto and an engine power shaft driving bevel gear means, the combination of an angular drive assembly with a centerline straddling that of the engine power shaft driven by the said bevel gear means comprising; a fluid torque converter, an output shaft for said converter, selective clutch means adapted to couple said power shaft with said fluid torque converter or to said output shaft directly, said clutch means and converter being at one side of the intersection of said centerlines, a forward and reverse gear unit located at the other side of said intersection and driven by said output shaft of said converter, and a propeller shaft coupling said unit and said axle in approximate centerline relationship to said assembly.

13. In power drives for a motor vehicle having a driving differential axle located transversely of the vehicle, with an engine located adjacent said axle with its centerline parallel thereto, and an engine shaft driving bevel gear means, the combination of an angular drive assembly driven by said bevel gear, comprising a fluid torque converter, an output shaft for said converter, selective clutch means adapted to couple said bevel gear means alternately to said fluid torque converter or to said converter output shaft directly, said clutch means and said converter being located to one side of the said engine shaft centerline, a forward and reverse gear unit driven by said converter output shaft located at the other side of the said power shaft centerline, and a propeller shaft mounted for swinging approximately in a plane lying in the centerline of said angular drive assembly and coupling the end of said unit remote from said clutch means and said converter to said axle.

14. In a power transmission assembly including a fluid torque converter with a pair of alternately operable friction clutches one of which couples to the input of said converter, the combination of a power input shaft, a main transmission shaft and a hollow input shaft coupled by bevel gearing to said power input shaft said latter two shafts being in concentric alignment with said hollow input shaft surrounding a portion of said main transmission shaft and having a drum adapted to be coupled directly to said main transmission shaft by one of said clutches or to the input of said torque converter by the other of said clutches, a load shaft, a forward-and-reverse gear unit in line with said main transmission shaft and coupled thereto to transmit the power delivered by the latter to the said load shaft, and control means for selective alternation of engagement of said clutches and for changing the forward and reverse drive of said gear unit.

15. In a rear-engine drive vehicle and a power drive assembly for same comprising a transversely mounted engine and engine casing, the vehicle having a forwardly located differential axle parallel to the centerline of said engine, the combination of a power transmission housing supported on said casing extending forwardly and rearwardly of the centerline of said engine and supporting a power transmission assembly which includes input bevel gearing driven by said engine shaft and which drives said axle, said assembly including a transmission shaft coupled to a selective reverse-forward gearing unit adapted to drive said axle, and said combination including clutches coupling selectively the input gearing of said assembly with said transmission shaft or to the input of a fluid torque converter included in said assembly, the rotational centerlines of said clutches and said converter being concentric with said transmission shaft and said gearing unit, and compartmenting of said housing arranged for rear removal of said converter and said clutches without changing the normal drive relationship of the said bevel gearing, said transmission shaft and said unit.

16. In power transmission mechanisms, an engine shaft, mating driving bevel gearing having a first gear concentric with said shaft and a second gear on an inclined axis thereto, a flywheel, clutch mechanism and variable speed ratio transmission assembly adapted to be driven by said gearing, a transmission shaft extending across and intersecting the centerline of said engine shaft and adapted to be driven by said assembly, a power input shaft driven by the second of said bevel gears likewise extending across said intersection and driving said flywheel, a concentric torsional dampener device having its power input member directly connected to engine said shaft and its power output member directly connected to the first of said bevel gears and equipped with yielding members mounted to transmit torque yieldingly between said power input and output members circumferentially, said device having friction elements rotating with said members operative to absorb direct torsional impulses between said members and starter gear means on said flywheel adapted to deliver force to same effective to rotate said engine shaft by transmission thereto through said device.

17. In a rear-engine and power-plant equipped vehicle having a transversely mounted engine coupled by gearing to a clutch and change-speed gear assembly connected to drive a differential axle, the combination of a vibration dampener device adapted to deliver the torque of said engine and of a flywheel included in said assembly coupled thru said gearing to said device, and gear means on said flywheel to provide engine-starting torque from said flywheel thru said gearing and said device such that initial starting force applied to said means is transmitted to said engine by said device.

HANS O. SCHJOLIN.

REFERENCES CITED

The following references are of record in the file of this patent:

UNITED STATES PATENTS

| Number | Name | Date |
| --- | --- | --- |
| 1,580,327 | Ramsey | Apr. 13, 1926 |
| 1,749,554 | Wichert | Mar. 4, 1930 |
| 1,868,130 | Bauer et al. | July 19, 1932 |
| 1,900,119 | Lysholm et al. | Mar. 7, 1933 |
| 2,032,876 | Haltenberger | Mar. 3, 1936 |
| 2,037,464 | Flogaus | Apr. 14, 1936 |
| 2,042,570 | Wemp | June 2, 1936 |
| 2,077,452 | Wren | Apr. 20, 1937 |
| 2,096,981 | Schjolin | Oct. 26, 1937 |
| 2,125,441 | Haltenberger | Aug. 2, 1938 |
| 2,232,105 | Fageol | Feb. 18, 1941 |
| 2,380,677 | Schjolin | July 31, 1945 |